May 21, 1963 W. GLAMANN 3,090,194
INTERNAL COMBUSTION ENGINES
Filed Oct. 12, 1956 2 Sheets-Sheet 1
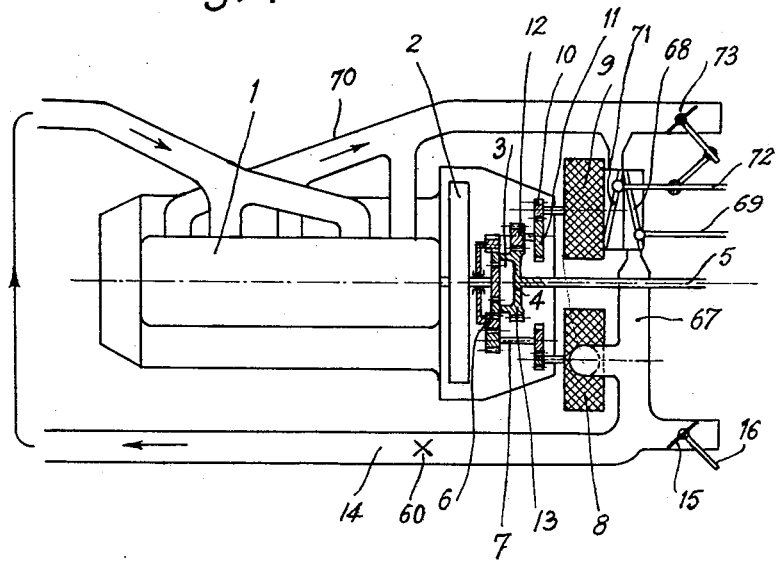
Inventor
W. Glamann
By Harcourt Downing Seebold
Attys.

May 21, 1963 W. GLAMANN 3,090,194
INTERNAL COMBUSTION ENGINES
Filed Oct. 12, 1956 2 Sheets-Sheet 2
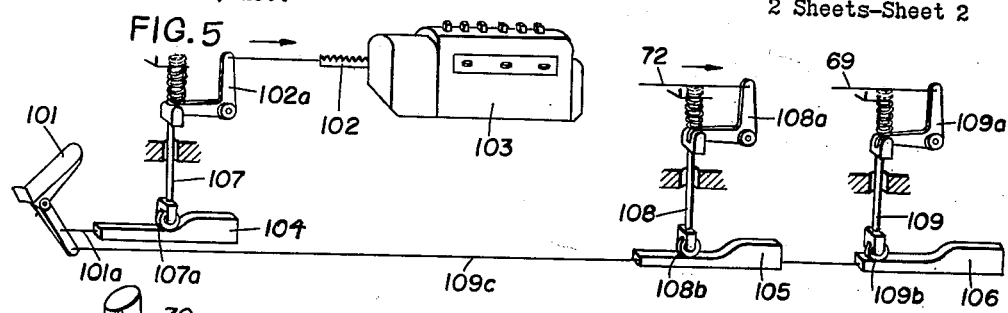
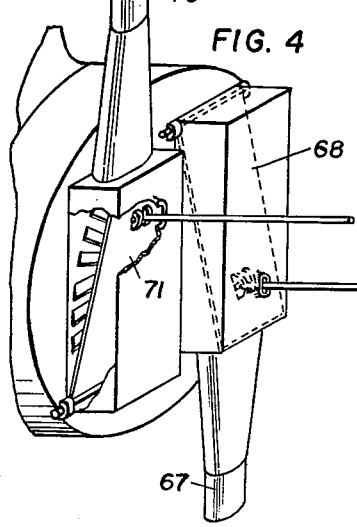
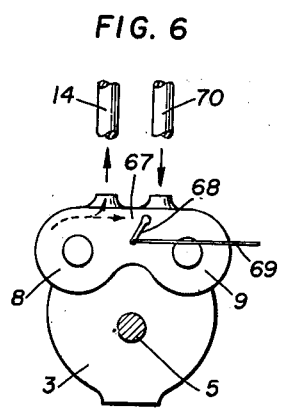
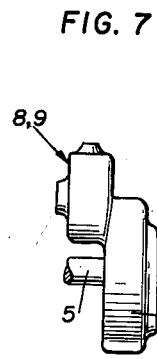
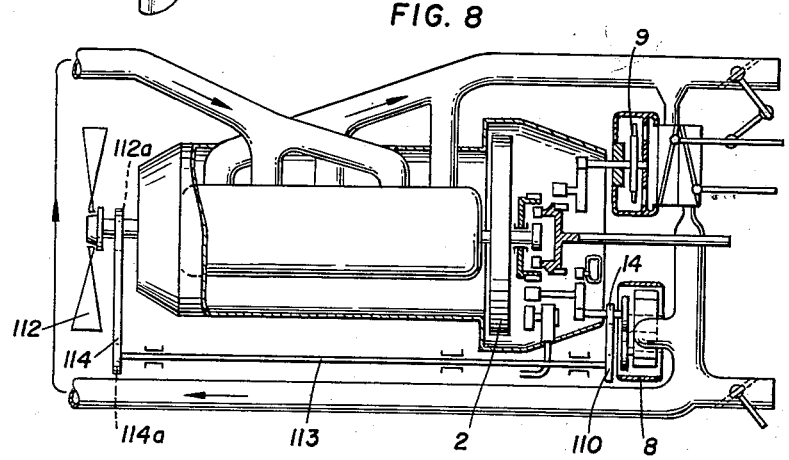
INVENTOR
WILHELM GLAMANN
BY
ATTORNEYS

United States Patent Office 3,090,194
Patented May 21, 1963

3,090,194
INTERNAL COMBUSTION ENGINES
Wilhelm Glamann, Lyons, France, assignor to Differential-Diesel, Vaduz, Furstentum, Liechtenstein
Filed Oct. 12, 1956, Ser. No. 615,622
1 Claim. (Cl. 60—13)

This application is a continuation-in-part of my co-pending application No. 228,019 of May 24, 1951, now abandoned.

The invention relates to a power installation for a road vehicle, comprising an internal combustion engine, and especially a diesel engine, the torque of which is subdivided in a differential gear train so as to serve on the one hand for driving a supercharger compressor for the engine and, on the other hand, for driving an outgoing shaft which propels the vehicle.

The combination has already been proposed of a piston engine with a turbine arranged on the exhaust and providing an auxiliary drive for the driving shaft.

It is also known, in an engine group with a turbine on the exhaust, driving a supercharger compressor for the engine, to supply the turbine, in addition to the exhaust gases, with the excess air delivered by the supercharger compressor.

These solutions with an auxiliary turbine give good results at high engine speeds, since at that moment there are enough exhaust gases to drive the turbine, but on the other hand, at low engine speeds the quantity of exhaust gas is not sufficient to drive the turbine.

The invention proposes to overcome these drawbacks. To this end, the invention provides the combination between a diesel engine and a turbine, the outlet of which provides an auxiliary drive for the driving shaft of the vehicle, this turbine being supplied by the exhaust gases of the vehicle.

In a preferred form of embodiment, the invention provides the combination with a diesel-turbine group of the kind referred to, of a compressor driven by a differential gear which supercharges the diesel engine, a part of the outlet air from the compressor being supplied to the turbine through appropriate members, so that the turbine is driven by a mixture of the compressor air with the exhaust gases or by the compressor outlet air alone.

In fact, in the case of a differential drive, the compressor supplies a high supercharging pressure also at very low speeds, with this pressure being a function of the engine torque and not of its speed. Thus, at low engine speeds, large quantities of exhaust gases are available and also high rates of flow of air under pressure obtained from the compressor, since these rates of flow only depend on the speed of the compressor and this speed is high at low engine speeds.

The exhaust gases and the great excess of air under pressure can thus be used with advantage to supply a turbine which drives the transmission passing to the wheels of the vehicle.

It is thus possible to obtain very high torques for the starting of the vehicle which can be still further increased by choosing in a judicious manner the ratio of transmission between the turbine and the shaft passing to the wheels. The maximum torque when the turbine is stopped is at least twice its maximum torque at normal speed. Since the turbine is fully supplied with exhaust gases already at very low engine speeds, it gives twice its normal torque during the starting up of the vehicle from rest. This torque can be multiplied by choosing the ratio between the speed of the turbine and that of the shaft passing to the wheels in such manner that the maximum speed of the turbine corresponds to a fraction of the maximum speed of the engine.

In addition, in accordance with a further feature of the invention, the torque of the turbine may be again increased by supplying it with an additional quantity of excess air from the compressor, with this air being partly burned in a combustion chamber when so required. On the whole, it is possible to obtain by all the means indicated, a torque up to ten times the normal starting torque obtained with the engine non-supercharged. The torque curve will be falling and it is possible to obtain an ideal driving curve whilst retaining an efficiency equal to that of combustion engines.

Finally, the solution proposed by the present invention has the very important advantage of enabling any kind of gear-box and clutch to be dispensed with, with a single pedal as the sole control member.

Further objects and special features of the invention will become apparent from the description which follows below, with reference to the accompanying drawings, in which:

FIG. 1 is a diagrammatic plan view of an engine provided with a turbine and a compressor combined in accordance with the invention;

FIG. 2 is a diagrammatic view in elevation of the turbine compressor unit with an intermediate combustion chamber;

FIG. 3 is a view in elevation of a speed-increasing gear arranged between the turbine and the driving shaft;

FIGURE 4 is a perspective view on an enlarged scale, partly broken away, of the distributor blades or valves illustrated in FIGURE 1;

FIGURE 5 is a diagrammatic view of the structural interrelationship between the accelerator pedal, the injection pump, and the control rods for the distributor blades or valves;

FIGURE 6 is an end elevational view of a single block containing the differential gear assembly, the compressor, and the gas;

FIGURE 7 is a side elevational view of the block shown in FIGURE 6, and,

FIGURE 8 is a diagrammatic plan view along the lines of FIGURE 1, illustrating a further form of the invention.

Referring now to the drawings, it is seen that the installation comprises an engine 1 provided with a flywheel 2, on the outgoing shaft of which is disposed a differential gear train assembly 3 driving through the satellite-carrier 4 the driving shaft 5 of the vehicle, the compressor 8 being driven through the intermediary of the external rotating crown-wheel 6 and a suitable multiplying gear 7.

The installation also comprises a turbine 9 which drives in known manner the outgoing shaft 5 through an intermediate step-down gearing constituted by the pinion 10, the pinions 11 and 12, and the crown-wheel 13. The compressor 8 supplies the engine by means of the pipe 14 which comprises a discharge orifice adapted to be closed by a controllable valve 15.

The exhaust turbine may be supplied automatically or at will with air derived from the compressor through the pipe 67, this air being brought, when so required, as shown in FIGURE 4, to the distributor blades 68 of the turbine which can be controlled by means of a lever 69. The exhaust gases coming from the exhaust pipe 70 are led into the turbine through a further distributor blade 71, the turbine being thus arranged in a manner known per se with a double distributor system. The two distributor blades in question may however be dispensed with, the closure function of the wheel 68 being replaced by a valve in the pipe 67.

The distributor blade 71 (FIGS. 1 and 4) can be controlled when so desired by means of a lever 72 which can be coupled for example to a throttling device 73 located in the exhaust pipe on the rear side of the branch leading to the turbine, in order that in proportion as the path in the direction of the turbine is opened to the exhaust gases by the actuation of the lever 72, their path to free air is closed. The driving pinion 10 is mounted on a free wheel of conventional type so that the turbine remains at rest when it is not supplied with gas.

In this form of embodiment, by reason of the high torque of the turbine when stationary or at low speeds, and because of the progressive increase of the speed of the compressor and of the engine, during a difficult starting period, which is accompanied by a continual increase in the supply to the turbine, both from the air supply side and from the gas supply side, it is possible to obtain a high output torque up to ten times the torque of the non-supercharged engine.

Such an increase may be facilitated by heating the air delivered from the compressor and deflected to the turbine, before its entry to the turbine, for example, by an injection of fuel and by its consequent combustion.

In FIG. 2, for example, a combustion chamber 80 has been shown diagrammatically, arranged in the conduit 81 which couples the compressor 82 to the exhaust turbine 83. This chamber consists of three essential members namely the mixing chamber 84, the fuel injector 85 and the ignition plug 86. Any other known means of preheating the air may however be employed to achieve the object, which is to increase the volume of gas sent from the compressor to the turbine, as is generally known in the technique of gas turbines.

In order to obtain operations with a single control pedal of the power installation with an incorporated exhaust turbine, as described above, the two levers 69 and 72 (see FIGS. 1 and 5) are coupled to the accelerator pedal in the following manner:

It will be seen that an injection pump 103 is provided with a toothed rack 102 which is suitably connected to one arm of a bellcrank lever 102a. The other arm of the bellcrank lever which is spring loaded, carries rod 107 provided with a roller follower 107a riding on a cam track 104. The cam track is connected as at 101a with an accelerator pedal 101.

The rod 72 which is connected to the element 71 at one end thereof is attached at its other end to one arm of a bellcrank lever 108a. As is also true of the bellcrank lever 108, the other arm of the lever is spring loaded, and has pivotally attached thereto rod 108 carrying a follower roller 108b at its lower end, and such roller rides on cam track 105. The rod 69 which is connected to the element 68 is also attached to one arm of bellcrank lever 109a, while the other arm is spring loaded, and carries connecting rod 109. The free end of the connecting rod supports a roller follower 109b, which rides on the cam track 106. The cam tracks 104, 105 and 106 are connected to the accelerator pedal by suitable connecting means 109c.

From the above it will be seen that the travel of the accelerator pedal is composed of three partial travels, as generally known in principle, the transition from one part to the other being indicated to the driver by a slight resistance to movement. The first partial travel is carried out in the manner described for the power installation without exhaust turbine in the co-pending application. At the end of this travel, the toothed rack 102 of the injection pump 103 has been moved forward up to its abutment, coupled to the supercharging pressure, and the discharge conduit 14 is still partly open until the vehicle has begun to move or until it has exceeded a certain minimum limit speed.

During the second partial travel of the pedal, the exhaust turbine is supplied with exhaust gases by actuation of the lever 72 through its operative connection to the cam track 105.

During the third part of the partial travel of the pedal, the member 68 for the air of the distributor blade of the turbine is opened through the medium of the lever 69 through its connection to the cam track 106, whilst the discharge conduit 14 is completely closed (unless it has already been automatically closed after the starting of the vehicle).

The various partial travels of the accelerator pedal may be also arranged in a different sequence or simultaneously or with a partial overlap.

This form of embodiment is of special advantage in the case of heavy lorries, motor-coach units and locomotives. In this form of embodiment, when a centrifugal type of compressor is employed, the discharge device 15 may be eliminated and replaced by the distributor blade wheel 68 of the turbine.

The centrifugal compressor may be combined with the turbine in a single casing so as to avoid loss of pressure. The differential gear may also be disposed in the same casing and FIGURES 6 and 7 disclose such an arrangement. The reversing gear may in this case be combined with the differential gear in a manner known per se, so that the unit will replace the ordinary gear-box, the gas turbine and the hydraulic clutch, whilst supplying a transmission with a continuous variation of torque having a high efficiency, with an extremely variable output torque and with a large increase in the power of the engine.

In certain cases of application of the present invention, it may be found useful to actuate simultaneously with the compressor, other auxiliary apparatus in the same manner, that is to say through the intermediary of the differential gear. By way of example, it is possible to drive, from the power take-off which serves to drive the compressor, the engine oil pump, the pressure of which would thus increase with advantage as the engine load increases, or the fan, or the water pump, or other members the full operation of which at low speeds and high load of the engine would offer a certain advantage.

As shown in FIGURE 8, a supplementary or auxiliary pinion 110 meshes with pinion 111 on the compressor shaft, and the pinion 110 is carried by longitudinally extending shaft 113. The opposite end of the shaft 113 carries a pulley 114a in alignment with pulley 112a on the shaft of fan 112. A belt 114 is trained about the pulleys 112a and 114a. Manifestly, the fan 112 will be rotated by virtue of the pinion 110, shaft 113, and the belt 114.

In order to utilize the energy of the exhaust gases of the exhaust turbine, not only when starting up and at low speeds of the vehicle, but also at its full speed, it is proposed, in accordance with the invention, to change the gear-reduction ratio of the turbine as soon as its speed passes a certain maximum limiting speed. This change may be effected automatically by a device already known in principle, and which acts under the control of centrifugal force.

FIG. 3 shows a diagrammatic example of such a device for changing the step-down gear ratio. The turbine 90 first drives, that is to say at low speeds of the driving shaft 91, through the intermediary of the gear train 92—93, as previously described. As soon as the shaft A exceeds a certain speed, the pinion 94, which up to that point has rotated freely on the shaft A, becomes fixed to this shaft by the action of the centrifugal clutch 95. A speed responsive device 97—98 is associated with the shaft A. At this moment, the turbine slows down and the pinion 92 begins to rotate on its free wheel which is provided for the case when the turbine is not supplied, as has already been described. From this moment onwards, the drive of the shaft from the turbine is effected through the intermediary of the step-down gear 96, 94, the ratio of which is less than the train 92—93, the pinion 96 being fixedly mounted on its transmission shaft.

I claim:

A power unit of high starting torque, comprising an internal combustion engine, an input shaft driven by said engine, an output shaft, differential gear means interconnecting the input shaft and the output shaft, said differential gear means comprising an input gear and two output gears, the input gear being connected to the input shaft, one of said output gears being connected to said output shaft, a compressor, a tubular conduit between the compressor and the engine for supercharging the engine, means for driving the compressor from one of said output gears, a gas turbine means for supplying to the turbine gas compressed by the compressor, an output shaft driven by said turbine, and a driving connection between the connecting output shaft of the turbine and said output shaft whereby to increase the torque applied to said output shaft by the differential gear means and to absorb usefully the power applied to the compressor under high torque loads applied on the output shaft, said driving connection including one higher ratio speed reduction gear and one lower ratio speed reduction gear adapted to be placed into operation alternatively with the gear having the higher ratio being used during starting at low speeds and the gear with the lower ratio being used at high speeds, and centrifugal means connected to the gear of lower ratio and operative to automatically engage the same when the speed of the turbine reaches a predetermined value.

References Cited in the file of this patent

UNITED STATES PATENTS

| | | |
|---|---|---|
| 1,894,117 | Pollard et al. | Jan. 10, 1933 |
| 2,149,785 | Neugebauer | Mar. 7, 1939 |
| 2,197,179 | Hersey | Apr. 16, 1940 |
| 2,305,810 | Muller | Dec. 22, 1942 |
| 2,379,455 | Prince | July 3, 1945 |
| 2,585,968 | Schneider | Feb. 19, 1952 |
| 2,765,616 | Cockerell | Oct. 9, 1956 |
| 2,848,866 | Geislinger | Aug. 26, 1958 |

FOREIGN PATENTS

| | | |
|---|---|---|
| 918,852 | France | Nov. 12, 1946 |
| 287,595 | Great Britain | Mar. 29, 1928 |